United States Patent
Yoshikawa et al.

(10) Patent No.: US 7,714,474 B2
(45) Date of Patent: May 11, 2010

(54) ELECTRICAL MACHINE HAVING A FLATTENED STATOR WITH INCLINED TEETH

(75) Inventors: Yuichi Yoshikawa, Osaka (JP); Yuichi Tanabe, Fukui (JP); Hiroshi Murakami, Osaka (JP); Hideharu Hiwaki, Osaka (JP); Koji Kuyama, Tottori (JP); Akio Ando, Tottori (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 12/064,871

(22) PCT Filed: Nov. 24, 2006

(86) PCT No.: PCT/JP2006/324042

§ 371 (c)(1),
(2), (4) Date: Feb. 26, 2008

(87) PCT Pub. No.: WO2007/061135

PCT Pub. Date: May 31, 2007

(65) Prior Publication Data

US 2009/0134738 A1 May 28, 2009

(30) Foreign Application Priority Data

Nov. 28, 2005 (JP) ............................. 2005-341749

(51) Int. Cl.
*H02K 1/16* (2006.01)

(52) U.S. Cl. .................. 310/216.001; 310/216.111; 310/254.1

(58) Field of Classification Search .......... 310/216.001, 310/4, 111, 18, 254, 49 R, 254.1
See application file for complete search history.

(56) References Cited

U.S. PATENT DOCUMENTS 2,830,209 A * 4/1958 Fleckenstein ........ 310/216.071
2003/0201137 A1 10/2003 Crapo et al.

FOREIGN PATENT DOCUMENTS

| DE | 19 64 900 A | 7/1971 |
|----|-------------|--------|
| JP | 04-355651 A | 12/1992 |
| JP | 2002-136090 A | 5/2002 |
| JP | 2003-169430 A | 6/2003 |

OTHER PUBLICATIONS

International Search Report for PCT/JP/2006/324042, dated May 9, 2007.

* cited by examiner

*Primary Examiner*—Quyen Leung
*Assistant Examiner*—Naishadh N Desai
(74) *Attorney, Agent, or Firm*—RatnerPrestia

(57) ABSTRACT

In a stator core having "N" slots, a tooth-width centerline of a linear yoke and a first extension line extended horizontally from a center of rotary shaft toward the linear yoke form a first angle. Assume there are first point on the first extension line at a first distance from the center, a second extension line drawn at a second distance horizontally from the center toward the linear yoke and extended vertically toward arc-shaped yokes, and a third extension line drawn from the center toward teeth ends of the linear yokes with angle "K". The second and third extension line intersect at a second point. A line between the first and second points intersects with the first extension line, thereby forming the first angle. In this structure, $0<a<b$, and $(360/2N-60/2N)°<K<(360/2N+60/2N)°$ are established, where "a", "b" are the first and the second distances respectively.

6 Claims, 9 Drawing Sheets

ELECTRICAL MACHINE HAVING A FLATTENED STATOR WITH INCLINED TEETH

This application is a U.S. National Phase application of PCT International application PCT/JP 2006/324042.

TECHNICAL FIELD

The present invention relates to a motor and an apparatus that employs the same motor, more particularly, it relates to a stator structure of the motor.

BACKGROUND ART

FIG. 9-FIG. 11 show conventional motors. FIG. 9 shows a sectional view of a conventional round motor, FIG. 10 shows a sectional view of a conventional flat motor, and FIG. 11 shows another conventional flat motor.

The round motor shown in FIG. 9 is a brushless motor, and formed of stator 101 and rotor 102. Each one of a plurality of teeth 103 of stator 101 is wound with a winding in a concentrated manner. Stator 101 has six slots. Rotor 102 includes permanent magnets 111 in which eight poles are available. The conventional motor shown in FIG. 9 thus forms a permanent-magnet motor having 8 poles and 6 slots.

A stator core of stator 101 comprises teeth 103 arranged radially, and arc-like yoke 104 coupling respective teeth 103 to each other. Each one of teeth 103 has tooth-end wider section 105, having a wider width along the rotational direction, at its inner end. Between the adjacent wider sections 105, slot open 106 is formed, and between adjacent teeth 103, slot 107 is formed. Each one of teeth 103 is wound with winding 109 via insulator 108. Windings 109 regularly employ three-phase windings.

Rotor 102 is rotatably held inside stator 101 via clearance in between, and concentric with stator 101. Rotor core 110 is mounted with ring-shaped permanent magnets 111. A rotary shaft is inserted into shaft hole 112. Rotor 102 is rotated on the rotary shaft with a rotating magnetic field generated by an electric current running through windings 109 provided to stator 101.

The flat brushless motor shown in FIG. 10 has been designed for downsizing the round brushless motor shown in FIG. 9 and yet for obtaining higher power. A structure of this kind of flat brushless motor is disclosed in, e.g. Unexamined Japanese Patent Publication No. 2002-136090. Flat brushless motor 120 shown in FIG. 10 includes teeth 123 arranged in parallel with each other; however, teeth 123 have different shapes, so that cogging torque tends to occur.

FIG. 11 shows another conventional flat motor, which produces less cogging torque than the motor shown in FIG. 10. In FIG. 11, elements having the same functions as those shown in FIG. 9 have the same reference marks, and the descriptions thereof are omitted here.

Stator 113 of the motor shown in FIG. 11 includes a plurality of teeth 103 radially arranged, arc-like yokes 104 and linear yokes 114 coupling respective teeth 103 to each other at the outer walls of teeth 103. Two arc-like yokes 104 and two linear yokes 114 are alternately connected to each other so that two linear yokes 114 can be in parallel with each other. This structure forms the motor flat, which allows providing a compact brushless motor outputting higher power.

However, the foregoing shape of stator 113 sets a limit to a sectional area of the windings at flat sections because the sectional area of each one of three-phase windings differs from each other, and the entire windings are thus determined under this limitation. As a result, the higher power of the flat motor shown in FIG. 11 is limited, so that it may happen that necessary power cannot be obtained from the motor.

DISCLOSURE OF INVENTION

A motor of the present invention comprises the following elements:
  a stator including a stator core having a plurality of teeth radially arranged, a yoke coupling the respective teeth to each other at the outer wall of the teeth, teeth-end wider sections provided to ends of the respective teeth and slot-opens provided between adjacent teeth-end wider sections, and windings provided to the teeth, and
  a rotor held rotatably while confronting the stator via a clearance, and including permanent magnets magnetized a plurality of poles.

The yoke is formed of two arc-shaped yokes and two linear yokes coupled alternately to each other. An outer appearance of the stator core looks flat because two linear yokes are placed in parallel with each other. Width center lines of the teeth provided to the arc-shaped yokes run through a center point of a rotary shaft of the motor.

A width center line of at least one of the teeth provided to the linear yokes intersects with a first extension line extended horizontally from the center point toward the linear yoke, thereby forming a first angle. On the first extension line, a first point is marked at a first distance "a" from the center point. A second extension line is drawn at a second distance "b" horizontally from the center point toward the linear yoke and extended vertically toward the arc-shaped yokes. A third extension line is drawn from the center point toward ends of the tooth provided to the linear yoke with a second angle "K". The second and third extension lines intersect with each other at a second point. A straight line between the first and second points intersects with the first extension line, thereby forming an angle, which is the first angle.

Between the dimensions discussed above, the following relations should be established: 0<a<b, where "a"=the first distance, and "b"=the second distance.

The second angle is formed as (360/2N−60/2N) degrees<K<(360/2N+60/2N) degrees, where "N"=number of slots of the stator core, and "K"=the second angle.

This structure allows increasing the sectional area of the windings without increasing the cogging torque, so that the motor can produce higher power. As a result, a motor of higher power is obtainable.

BRIEF DESCRIPTIONS OF DRAWINGS

FIG. 1 schematically shows a stator core of a motor in accordance with a first embodiment of the present invention.

FIG. 2 compares respective sectional areas of the windings of a conventional flat motor vs. a flat motor of the present invention.

FIG. 3 compares respective "rpm vs. torque" characteristics of a conventional flat motor vs. a flat motor of the present invention.

Figure 6:
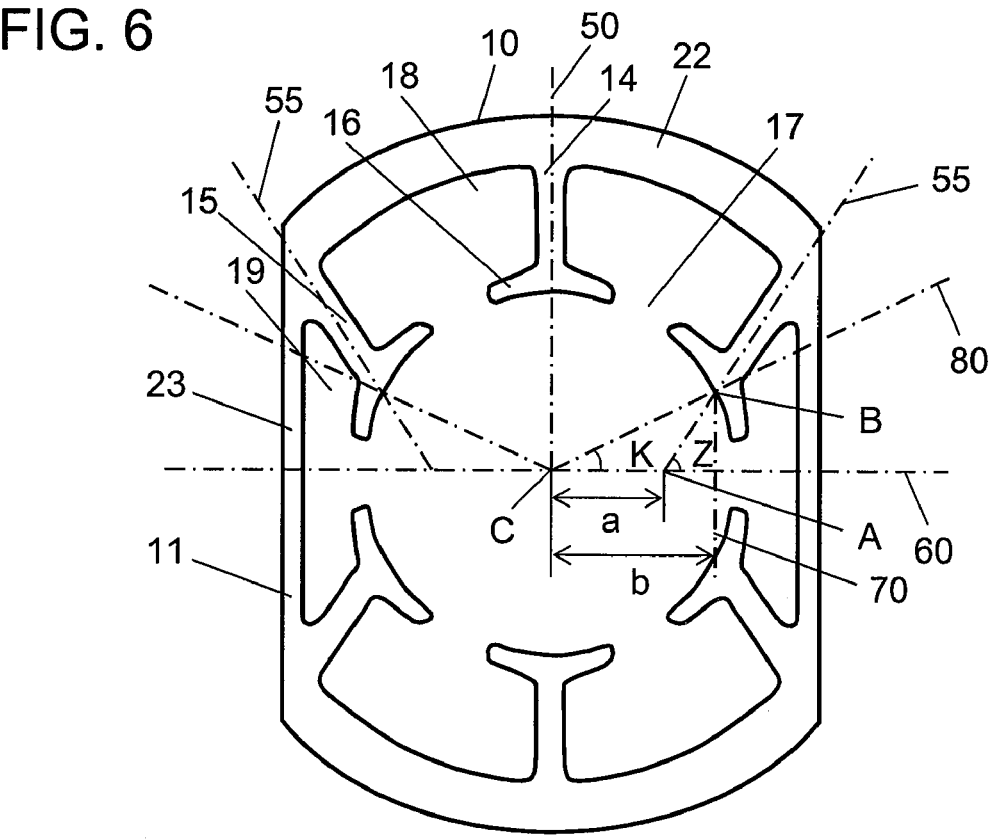

FIG. 6 schematically shows a stator core of a motor in accordance with a second embodiment of the present invention.

Figure 7:
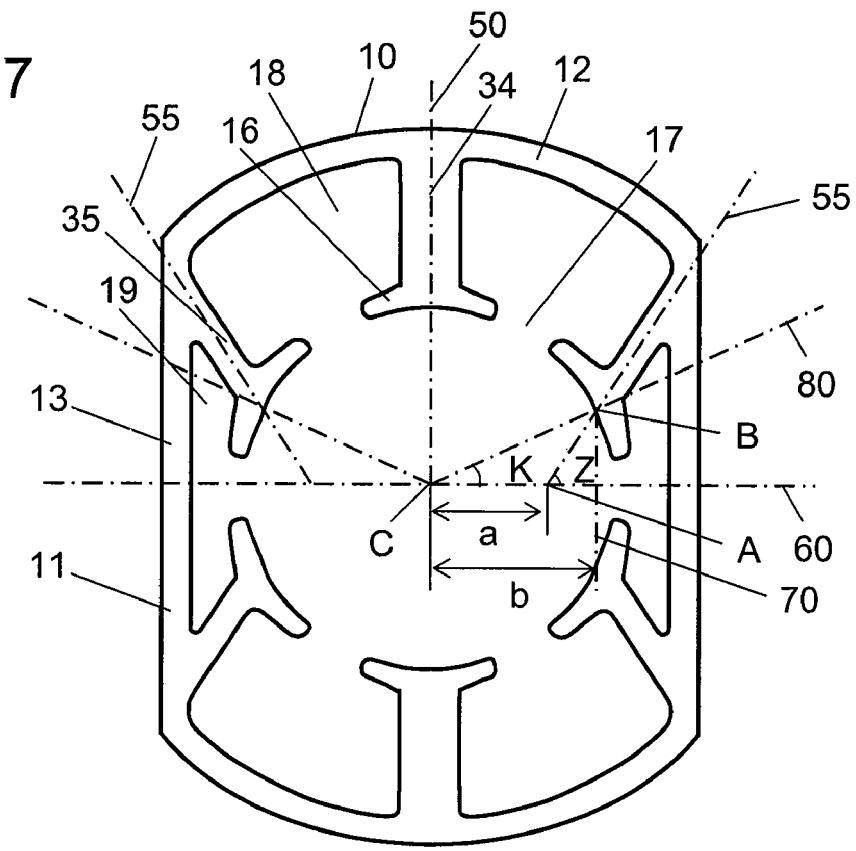

FIG. 7 schematically shows a stator core of a motor in accordance with a third embodiment of the present invention.

Figure 8:
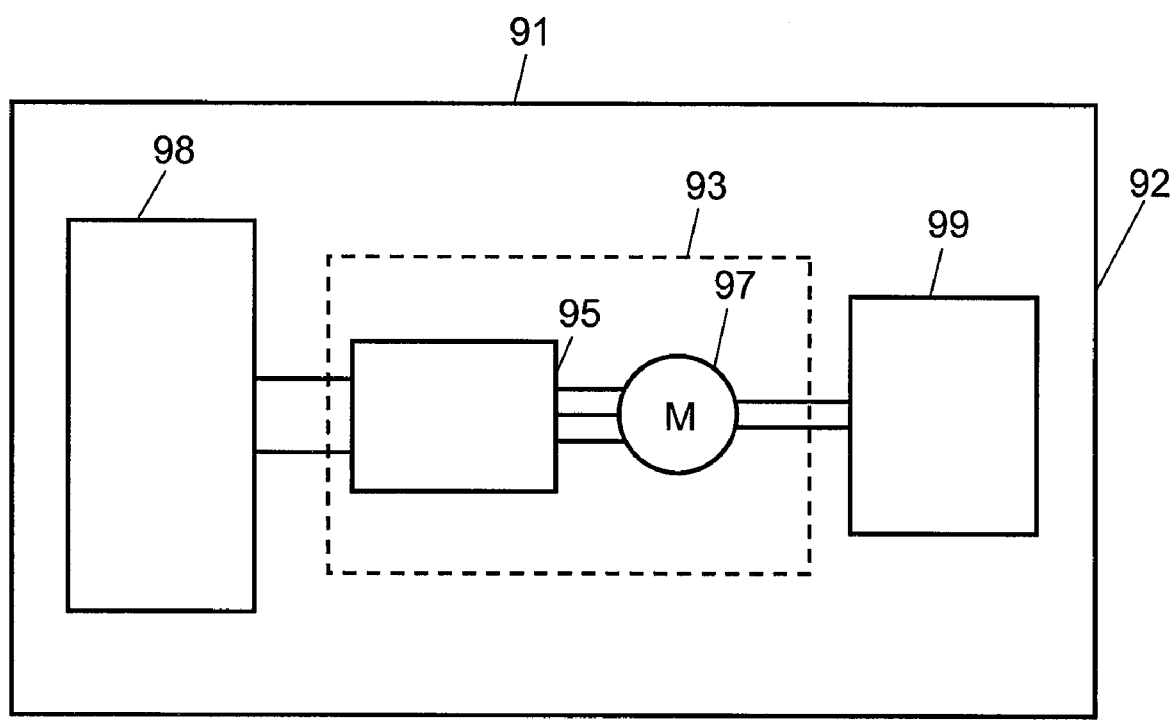

FIG. 8 schematically shows an apparatus in accordance with a fifth embodiment of the present invention.

Figure 9:
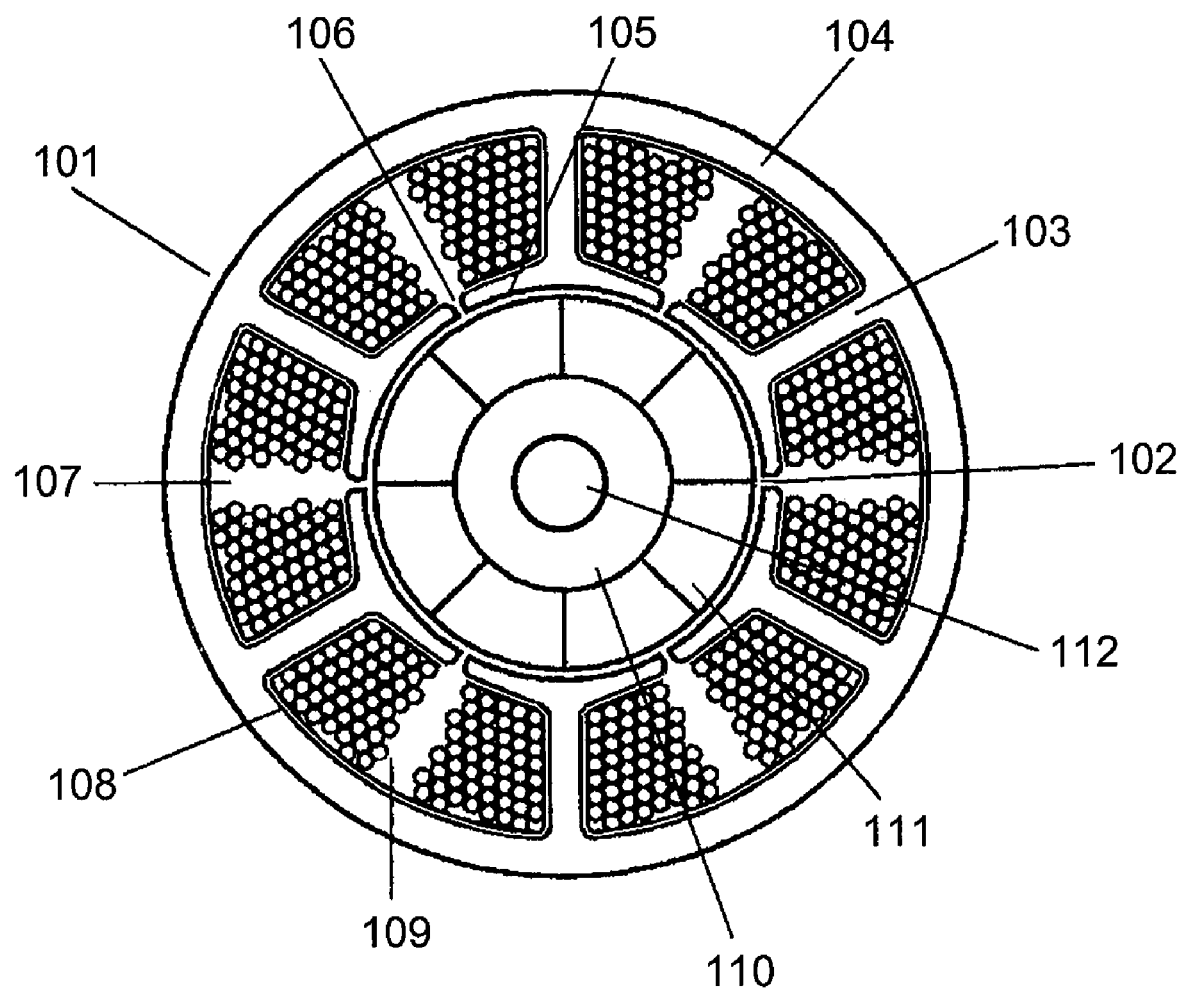

FIG. 9 shows a sectional view of a conventional round motor.

Figure 10:
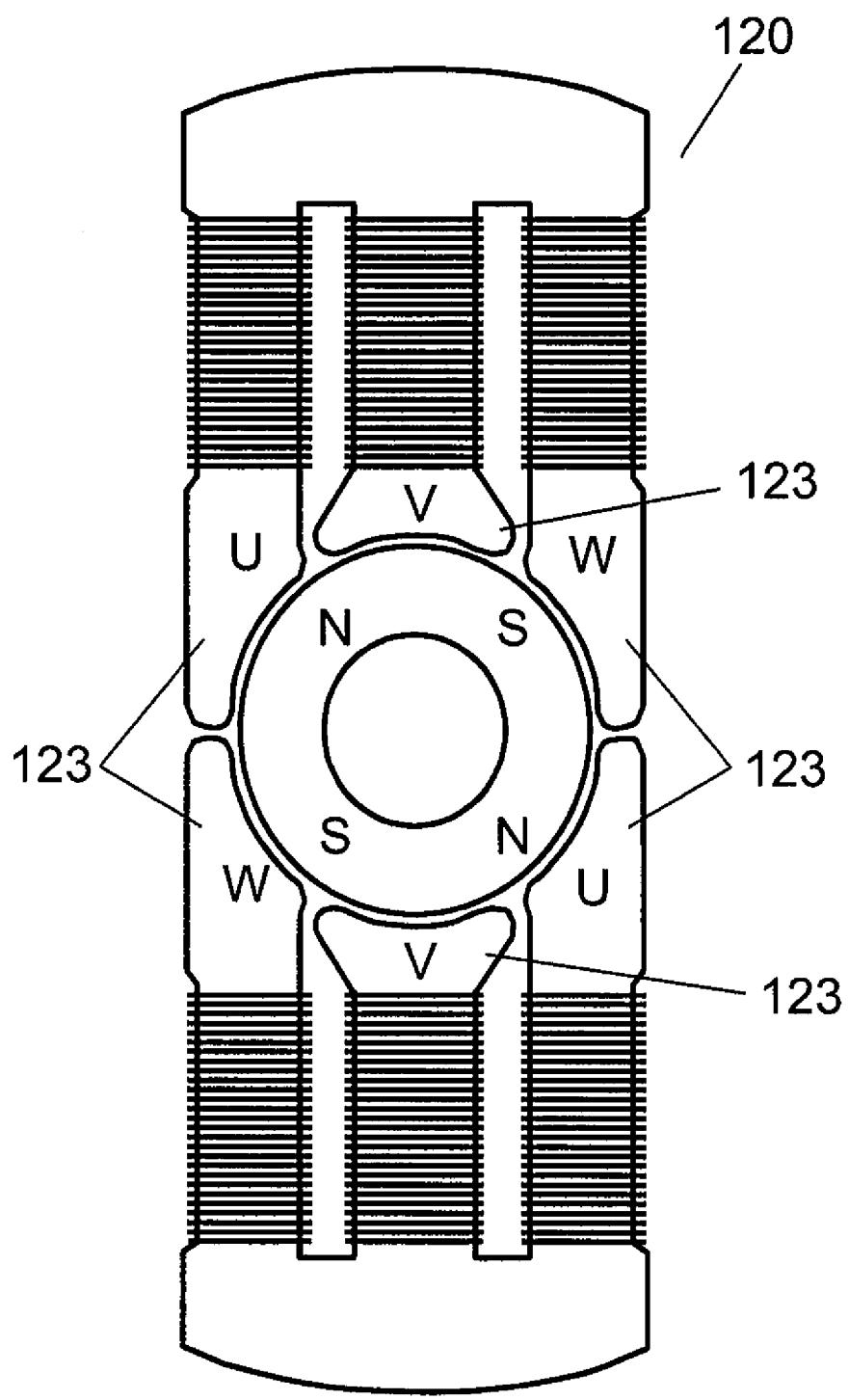

FIG. 10 shows a sectional view of a conventional flat motor.

Figure 11:
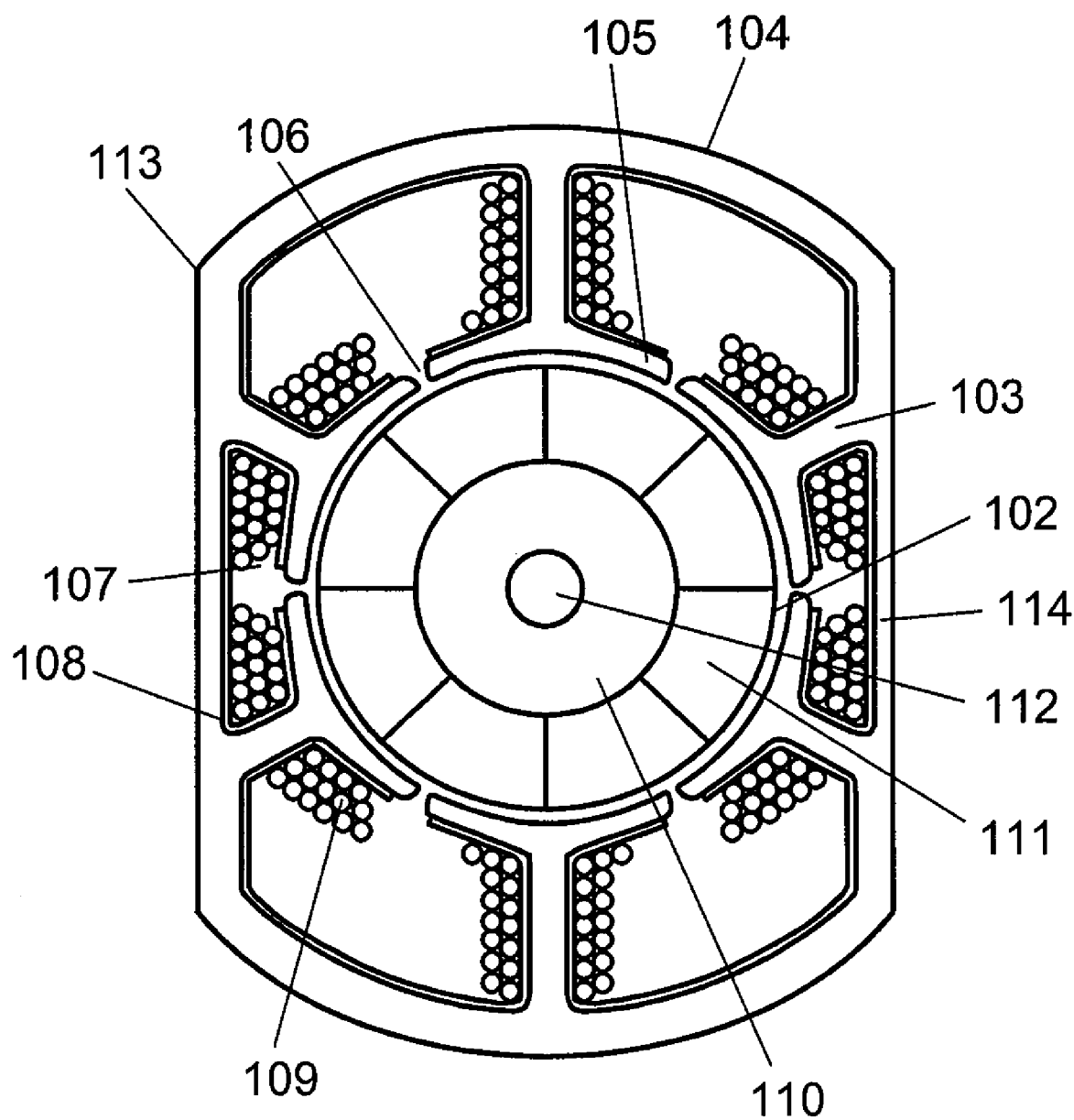

FIG. 11 shows a sectional view of another conventional flat motor.

DESCRIPTION OF PREFERRED EMBODIMENTS

Exemplary embodiments of the present invention are demonstrated hereinafter with reference to the accompanying drawings.

Embodiment 1

Major structural elements used in this first embodiment are described hereinafter with reference to FIG. 1.

Stator 10 of the motor comprises the following elements:
  stator core 11 including:
    a plurality of teeth 14, 15 radially arranged;
    yokes 12, 13 coupling teeth 14, 15 to each other at outer walls of teeth 14, 15;
    tooth-end wider sections 16 formed at respective ends of teeth 14, 15;
    slot-opens 17 formed between adjacent tooth-end wider sections 16; and
  windings (not shown) wound on teeth 14, 15.

A rotor of the motor is supported rotatably while confronting stator 10 via clearance in between, and includes permanent magnets (not shown) magnetized a plurality of poles.

The entire yoke is formed of two arc-shaped yokes 12 and two linear yokes 13, each one of them are coupled alternately. The outer circumference of stator core 11 looks flat because two linear yokes 13 are placed in parallel to each other. Width center lines 50 of teeth 14 provided to arc-shaped yokes 12 run through center point "C" of the rotary shaft of the motor.

Width center line 55 of at least one tooth 15 provided to linear yoke 13 intersects with first extension line 60 extended horizontally from center point "C" toward linear yoke 13, thereby forming first angle "Z". On first extension line 60, first point "A" is marked at first distance "a" from center point "C". Second extension line 70 is drawn at second distance "b" horizontally from center point "C" toward linear yoke 13 and extended vertically toward arc-shaped yoke 12. Third extension line 80 is drawn from center point "C" toward the end of tooth 15 provided to linear yoke 13 with second angle "K". Second and third extension lines 70, 80 intersect with each other at second point "B". A straight line between first and second points "A" and "B" intersects with first extension line 60, thereby forming an angle, which is first angle "Z". Between the dimensions discussed above, the following relations should be established:

0<a<b, where "a"=first distance, and "b"=second distance.
(360/2N−60/2N) degrees<K<(360/2N+60/2N) degrees, where "N" number of slots of the stator core 11, and "K"=second angle.

Figure 3:
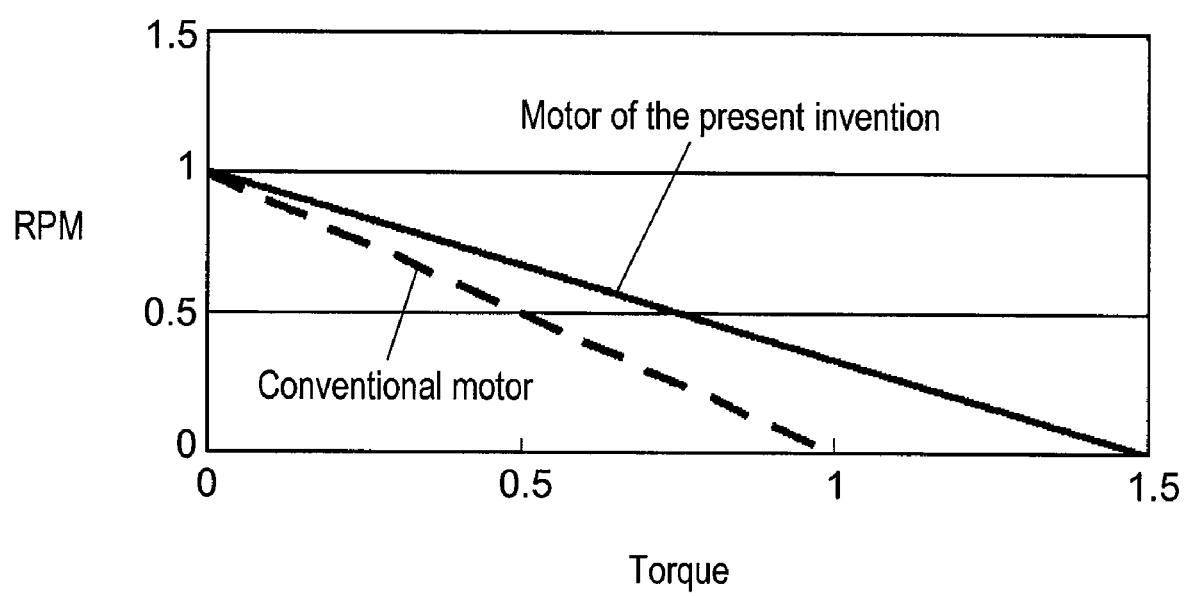
Figure 4A:
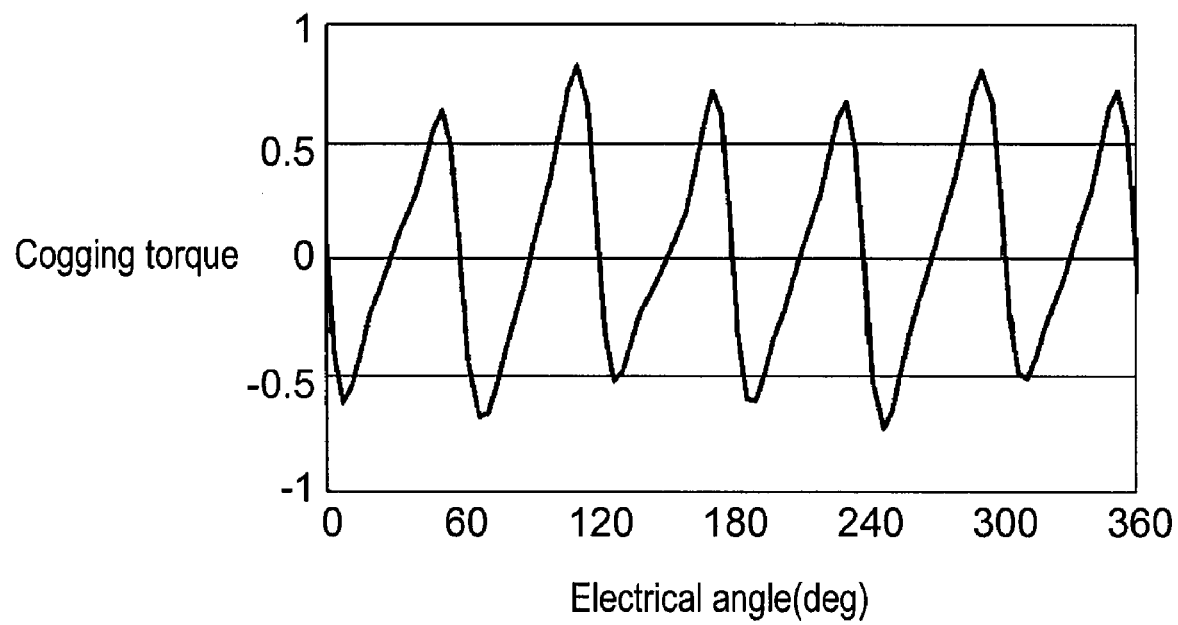
FIG. 4A shows cogging torque produced by a conventional flat motor.
Figure 4B:
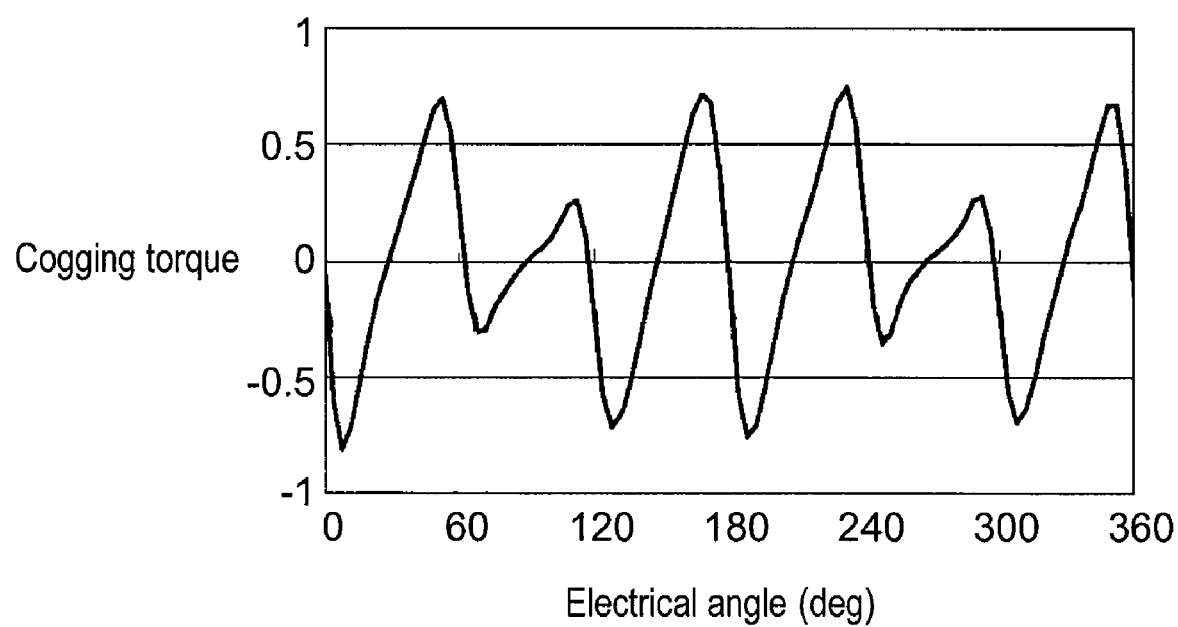
FIG. 4B shows cogging torque produced by a flat motor of the present invention.
Figure 5A:
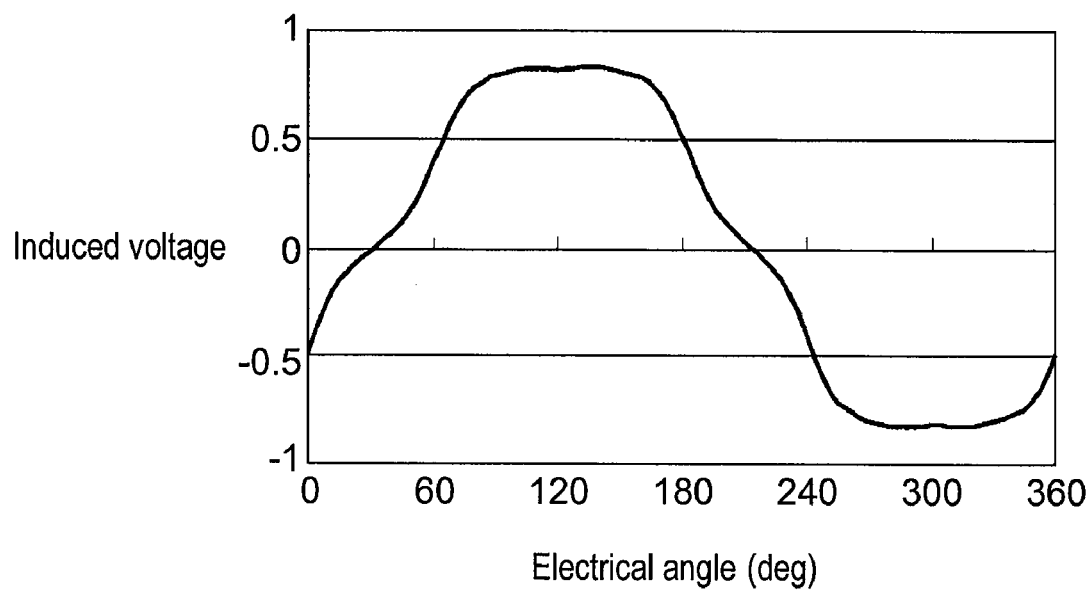
FIG. 5A shows an induced voltage of a conventional flat motor.
Figure 5B:
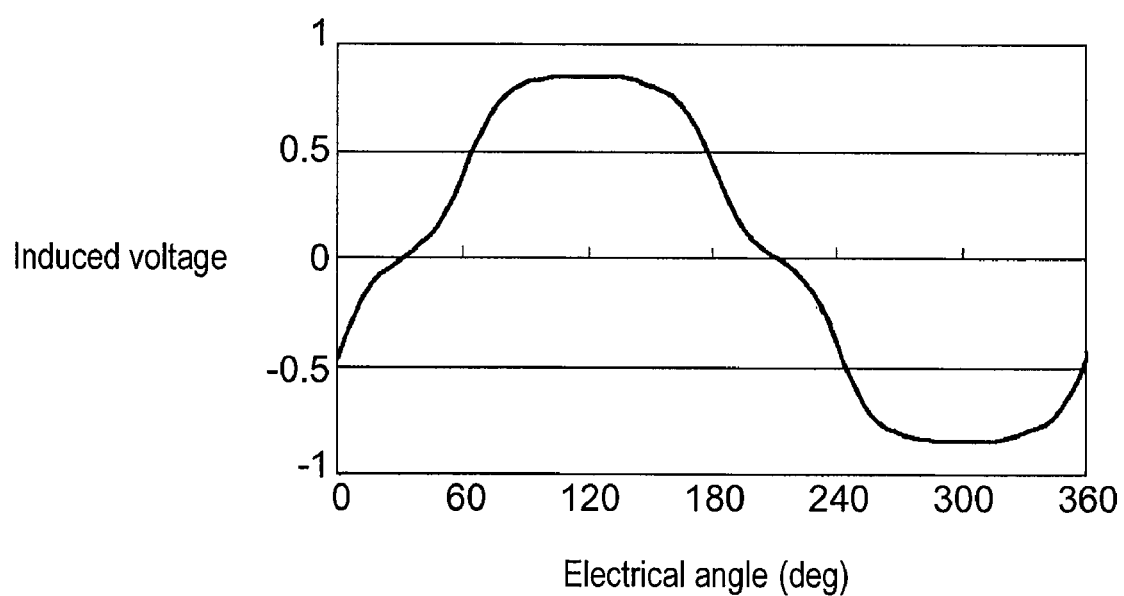
FIG. 5B shows an induced voltage of a flat motor of the present invention.

The first embodiment is further detailed hereinafter with reference to FIG. 1-FIG. 5B. FIG. 1 schematically shows the stator core of the motor in accordance with the first embodiment of the present invention. FIG. 2 compares respective sectional areas of the windings of a conventional flat motor vs. a flat motor of the present invention. FIG. 3 compares respective "rpm vs. torque" characteristics of a conventional flat motor vs. a flat motor of the present invention. FIG. 4A shows cogging torque produced by a conventional flat motor. FIG. 4B shows cogging torque produced by a flat motor of the present invention. FIG. 5A shows an induced voltage of a conventional flat motor. FIG. 5B shows an induced voltage of a flat motor of the present invention.

The motor in accordance with the first embodiment forms a flat brushless motor, and includes stator 10 and a rotor (not shown). Stator 10 has a plurality of teeth 14, 15 wound with windings in a concentrated manner, and six slots. The rotor is not shown because of its complicated illustration; however, it has a similar structure to rotor 102 of the conventional motor shown in FIG. 11.

A structure of stator 10 is discussed hereinafter with particular emphasis because it is one of the features of the present invention. Stator core 11 of stator 10 includes the following elements:
  two arc-shaped yokes 12;
  two linear yokes 13;
  two teeth 14 each one of which is provided at the center of respective arc-shaped yokes 12; and
  four teeth 15 two of which are formed near both the ends of respective two linear yokes 13.

Width center line 50 extending through the respective width centers of teeth 14 runs through center point "C" of the rotary shaft of the motor.

Each one of teeth 15 is structured as follows: Width center line 55 of at least one tooth 15 provided to linear yoke 13 intersects with first extension line 60 extended horizontally from center point "C" toward linear yoke 13, thereby forming first angle "Z". On first extension line 60, first point "A" is marked at first distance "a" from center point "C". Second extension line 70 is drawn at second distance "b" horizontally from center point "C" toward linear yoke 13 and extended vertically toward arc-shaped yoke 12. Third extension line 80 is drawn from center point "C" toward the end of tooth 15 provided to linear yoke 13 with second angle "K". Second and third extension lines 70, 80 intersect with each other at second point "B". A straight line between first and second points "A" and "B" intersects with first extension line 60, thereby forming an angle, which is first angle "Z". Between the dimensions discussed above, the following relation should be established:

0<a<b, where "a"=first distance, and "b"=second distance.

Second point "B" is determined by second angle "K", which is preferably set within the following range with its center at 360/2N degrees: (360/2N−60/2N) degrees<K<(360/2N+60/2N) degrees, where "N"=number of slots of the stator core 11. Second angle "K" falling within the foregoing range invites smaller cogging torque; however, second angle "K" out of the above range invites substantially greater cogging torque.

It is proved that the motor in accordance with this first embodiment produces small cogging torque provided that the number of slots (N) is 6 and second angle (K) falls within the range from 25° to 35° with its center at 30°. The motor thus employs second angle "K" of 30°.

Teeth 14 and 15 have tooth-end wider sections 16, of which width is wider along the rotating direction, at their inner ends. Between adjacent tooth-end wider sections 16, slot open 17 is formed, and between adjacent each one of teeth 14 and 15, slot 18 and slot 19 are formed respectively. Three-phase winding is wound on respective teeth 14, 15.

The rotor (not shown) is placed inside stator 10 such that it is concentric with stator 10 and held rotatably via clearance in between. A rotor core of the rotor is mounted with ring-shaped permanent magnets. The rotor is rotated on the rotary shaft by rotating magnetic field produced by an electric current running through the three-phase windings provided to stator 10.

Figure 1:
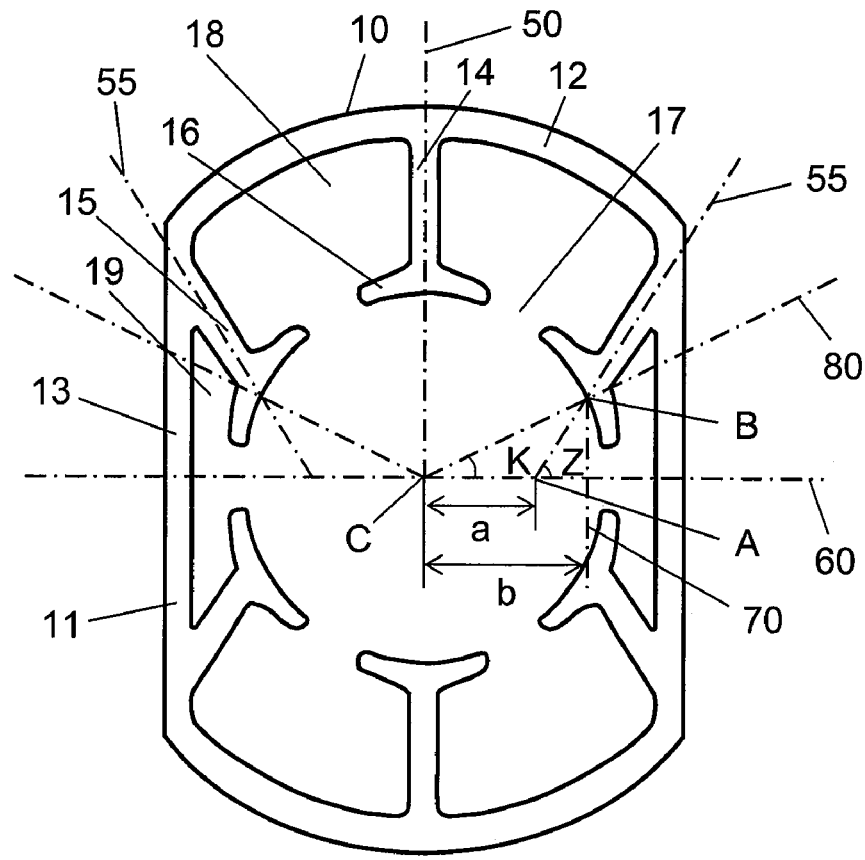
Figure 2:
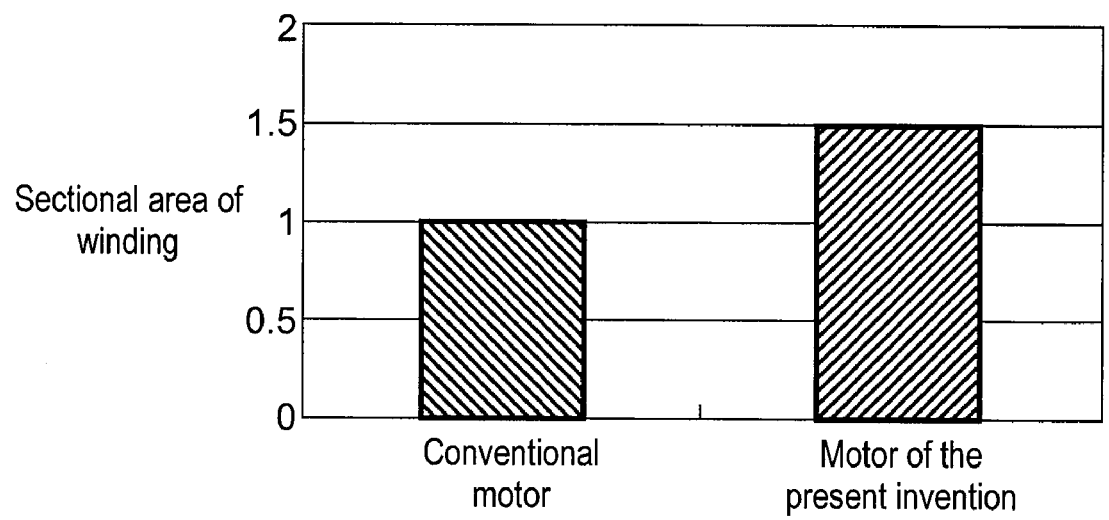

FIG. 2 compares a sectional area occupying slot 107 of the conventional flat motor shown in FIG. 11 with a sectional area occupying slot 19 of the flat motor of the present invention shown in FIG. 1. As FIG. 2 tells, the sectional area of the flat motor of the present invention is 1.5 times as much as that of the conventional flat motor.

FIG. 3 compares respective "rpm vs. torque" characteristics of the conventional flat motor vs. the flat motor of the present invention. In FIG. 3, assume that an rpm at no load and a starting torque of the conventional flat motor are respectively "1", and assume that an rpm at no load of the flat motor of the present invention is "1", then a starting torque of the flat motor of the present invention becomes "1.5". As FIG. 3 tells, the motor of the present invention produces higher power.

FIG. 4A shows cogging torque produced by the conventional flat motor, and FIG. 4B shows cogging torque produced by the flat motor of the present invention. The Y-axes and X-axes in both the drawings show a ratio of cogging torque and a rotating angle (electric angle) respectively.

FIG. 5A shows an induced voltage of the conventional flat motor, and FIG. 5B shows an induced voltage of the flat motor of the present invention. The Y-axes and X-axes in both the drawings show a ratio of the induced voltage generated on the windings of the respective motors and a rotating angle (electric angle) respectively.

FIGS. 4A and 4B tell that the motor of the present invention increases the sectional area of the windings free from an increment of cogging torque. FIGS. 5A and 5B tell that the motor of the present invention increases the sectional area of the windings free from a fall in induced voltage.

Embodiment 2

FIG. 6 schematically shows a stator core of a motor in accordance with the second embodiment of the present invention. In FIG. 6, elements having the same functions as those of the motor shown in FIG. 1 have the same reference marks, and the descriptions thereof are omitted here.

The second embodiment differs from the first one in the widths of arc-shaped yoke 22 and linear yoke 23. The width of linear yoke 23 is shortened with respect to that of arc-shaped yoke 22, thereby further increasing the sectional area of a winding of slot 19. As a result, the motor in accordance with the second embodiment can produce further higher power.

Embodiment 3

FIG. 7 schematically shows a stator core of a motor in accordance with the third embodiment of the present invention. In FIG. 7, elements having the same functions as those of the motor shown in FIG. 1 have the same reference marks, and the descriptions thereof are omitted here.

The third embodiment differs from the first embodiment in a width of at least one of the teeth. The width of tooth 35 provided to linear yoke 13 is shortened, thereby further increasing the sectional area of a winding of slot 19. As a result, the motor in accordance with the third embodiment can produce further higher power.

Embodiment 4

The stator core of the motor shown in FIG. 1 can have a core-dividing section (not shown) at each one of two linear yokes 13, so that a winding is provided to the stator core which has been split in advance into two core pieces. Then the core pieces are combined together for structuring stator 10.

For instance, in FIG. 1, linear yoke 13 is divided into two pieces along first extension line 60. This structure allows the concentrated winding to be wound efficiently on the tooth of each core piece at a higher density, so that the motor can produce further higher power.

In this case, these two core pieces are preferably combined such that the respective core-dividing sections have face-to-face contact with each other so that a magnetic circuit can be formed. This structure allows a magnetic flux to flow smooth between the core-dividing sections of the two core pieces, so that the division of the stator core does not invite reduction in the power of the motor.

The stator cores in accordance with Embodiments 2 and 3 illustrated in FIGS. 6 and 7 can be also divided into two pieces respectively, so that a similar advantage to the foregoing one can be expected.

Embodiment 5

FIG. 8 schematically shows an apparatus in accordance with the fifth embodiment of the present invention. In FIG. 8, apparatus 91 comprises the following elements: housing 92, motor 97 placed in housing 92, driver 95 for driving motor 97, power supply 98 for powering driver 95, and load 99 including mechanical sections driven by motor 97. Motor 97 and driver 95 form motor-driving device 93. In apparatus 91, power supply 98 drives motor 97 via driver 95. Rotating torque is transferred to load 99 via an output shaft of motor 97, which employs any one of the motors in accordance with Embodiments 1-4.

INDUSTRIAL APPLICABILITY

A motor in the present invention is useful for home appliances, or electrical devices that are equipped in vehicles. Those home appliances and electrical devices need to be compact because of a limited space for installation and require motors producing higher power.

REFERENCE NUMERALS IN THE DRAWINGS

10 Stator
11 Stator core
12, 22 Arc-shaped yoke
13, 23 linear yoke
14, 34 Teeth provided to the arc-shaped yoke
15, 35 Teeth provided to the linear yoke
16 Tooth-end wider section
17 Slot open
18, 19 Slot
50, 55 Width center line of teeth
60 First extension line
70 Second extension line
80 Third extension line
"a" First distance
"b" Second distance
"A" First point
"B" Second point
"C" Center point of the rotary shaft
"Z" First angle
"K" Second angle

The invention claimed is:

1. A motor comprising:
   (a) a stator including:
      (a-1) a stator core having a plurality of teeth radially arranged,
      a yoke coupling the respective teeth to each other at outer wall of the teeth, tooth-end wider sections provided to ends of the respective teeth, and slot-opens provided between adjacent tooth-end wider sections;
      (a-2) windings provided to the teeth, and
   (b) a rotor held rotatably, confronting the stator via a clearance in between, and including permanent magnets magnetized a plurality of poles,
   wherein the yoke is formed of two arc-shaped yokes and two linear yokes coupled alternately to each other,
   wherein the two linear yokes are placed in parallel with each other for shaping an outer circumference of the stator core flat,
   wherein a width center line of the teeth provided to the arc-shaped yokes runs through a center point of a rotary shaft of the motor;
   wherein a width center line of at least one of the teeth provided to the linear yokes intersects with a first extension line extended horizontally from the center point toward the linear yokes for forming a first angle, and on the first extension line, a first point is phantomly marked at a first distance from the center point, and a second extension line is drawn at a second distance horizontally from the center point toward the linear yokes and extended vertically toward the arc-shaped yokes, and a third extension line is drawn from the center point toward ends of the teeth provided to the linear yokes with a second angle, and the second and the third extension lines intersect with each other at a second point,
   wherein a straight line between the first and second points intersects with the first extension line for forming an angle, which is the first angle,
   wherein between the foregoing dimensions, $0<a<b$ is established, where "a" is the first distance, and "b" is the second distance, and the second angle is formed as $(360/2N-60/2N)$ degrees$<K<(360/2N+60/2N)$ degrees, where "N" is a number of slots of the stator core, and "K" is the second angle.

2. The motor of claim 1, wherein a width of the arc-shaped yokes differs from a width of the linear yokes.

3. The motor of claim 1, wherein a width of at least one of the teeth differs from widths of the other teeth.

4. The motor of claim 1, wherein the stator core is divided into two core pieces at a core-dividing section provided to the linear yokes,
   wherein the two core pieces having windings are combined together for structuring the stator.

5. The motor of claim 4, wherein the core-dividing sections of the two core pieces have face-to-face contact with each other for forming a magnetic circuit.

6. An apparatus employing the motor as defined in claim 1.

* * * * *